(12) United States Patent
Elgaafary

(10) Patent No.: US 11,838,297 B2
(45) Date of Patent: *Dec. 5, 2023

(54) GROUP VERIFICATION OF A TRANSMISSION SOURCE

(71) Applicant: UAB 360 IT, Vilnius (LT)

(72) Inventor: Mohamed Adly Amer Elgaafary, Vilnius (LT)

(73) Assignee: UAB 360 IT, Vilnius (LT)

( * ) Notice: Subject to any disclaimer, the term of this patent is extended or adjusted under 35 U.S.C. 154(b) by 0 days.

This patent is subject to a terminal disclaimer.

(21) Appl. No.: 17/698,028

(22) Filed: Mar. 18, 2022

(65) Prior Publication Data
US 2023/0300144 A1  Sep. 21, 2023

(51) Int. Cl.
*H04L 9/40* (2022.01)
(52) U.S. Cl.
CPC .................. *H04L 63/126* (2013.01)
(58) Field of Classification Search
CPC ...................................... H04L 63/126
See application file for complete search history.

(56) References Cited

U.S. PATENT DOCUMENTS

| | | | | |
|---|---|---|---|---|
| 11,317,288 | B2* | 4/2022 | Sundar | H04L 63/105 |
| 2019/0005241 | A1* | 1/2019 | Boutnaru | H04L 63/102 |
| 2020/0134181 | A1* | 4/2020 | Boutnaru | H04L 63/102 |
| 2021/0092094 | A1* | 3/2021 | Kim | H04L 63/08 |
| 2021/0200867 | A1* | 7/2021 | Schmugar | G06F 21/572 |

* cited by examiner

*Primary Examiner* — Amie C. Lin
(74) *Attorney, Agent, or Firm* — The Pattani Law Group

(57) ABSTRACT

A method including transmitting, by a transmitting device, verification information including a current fingerprint associated with a first instance of a source application stored on the transmitting device; receiving, by the transmitting device, a determination result determined based at least in part on a comparison of the current fingerprint with a verification fingerprint associated with a second instance of the source application stored on another device; and selectively transmitting, by the transmitting device, transmission data utilizing the first instance of the source application based at least in part on the determination result. Various other aspects are contemplated.

20 Claims, 7 Drawing Sheets

GROUP VERIFICATION OF A TRANSMISSION SOURCE

FIELD OF DISCLOSURE

Aspects of the present disclosure generally relate to cyber security, and more particularly to group verification of a transmission source to mitigate the risks associated with cybercrimes.

BACKGROUND

A user device may rely on a network to communicate information and/or to communicate messages with another user device. Such information and/or messages may include private information and/or sensitive data associated with the user device. The communication over the network may be vulnerable as being susceptible to a cybercrime, through which a malicious entity may attempt to steal, alter, disable, expose, or destroy the information through unauthorized access to the communicating user devices. A cybercrime may include, for example, a malware attack, a phishing attack, a ransomware attack, a virus attack, etc. As a result, cyber security measures may be used to prevent occurrence of the cybercrime and/or to mitigate risks associated with the cybercrime.

SUMMARY

In one aspect, the present disclosure contemplates a method including transmitting, by a transmitting device, verification information including a current fingerprint associated with a first instance of a source application stored on the transmitting device; receiving, by the transmitting device, a determination result determined based at least in part on a comparison of the current fingerprint with a verification fingerprint associated with a second instance of the source application stored on another device; and selectively transmitting, by the transmitting device, transmission data utilizing the first instance of the source application based at least in part on the determination result.

In another aspect, the present disclosure contemplates a transmitting device including a memory and a processor communicatively coupled to the memory, the memory and the processor being configured to: transmit verification information including a current fingerprint associated with a first instance of a source application stored on the transmitting device; receive a determination result determined based at least in part on a comparison of the current fingerprint with a verification fingerprint associated with a second instance of the source application stored on another device; and selectively transmit transmission data utilizing the first instance of the source application based at least in part on the determination result.

In another aspect, the present disclosure contemplates a non-transitory computer readable medium storing instructions, which when executed by a processor associated with a transmitting device, cause the processor to: transmit verification information including a current fingerprint associated with a first instance of a source application stored on the transmitting device; receive a determination result determined based at least in part on a comparison of the current fingerprint with a verification fingerprint associated with a second instance of the source application stored on another device; and selectively transmit transmission data utilizing the first instance of the source application based at least in part on the determination result.

It is to be understood that both the foregoing general description and the following detailed description are exemplary and explanatory in nature and are intended to provide an understanding of the present disclosure without limiting the scope thereof. In that regard, additional aspects, features, and advantages of the present disclosure will be apparent to one skilled in the art from the following detailed description.

BRIEF DESCRIPTION OF THE DRAWINGS

The accompanying drawings illustrate aspects of systems, devices, methods, and/or mediums disclosed herein and together with the description, serve to explain the principles of the present disclosure. Throughout this description, like elements, in whatever aspect described, refer to common elements wherever referred to and referenced by the same reference number. The characteristics, attributes, functions, interrelations ascribed to a particular element in one location apply to those elements when referred to by the same reference number in another location unless specifically stated otherwise.

The figures referenced below are drawn for ease of explanation of the basic teachings of the present disclosure; the extensions of the figures with respect to number, position, relationship, and dimensions of the parts to form the following aspects may be explained or may be within the skill of the art after the following description has been read and understood. Further, exact dimensions and dimensional proportions to conform to specific force, weight, strength, and similar requirements will likewise be within the skill of the art after the following description has been read and understood.

The following is a brief description of each figure used to describe the present disclosure, and thus, is being presented for illustrative purposes only and should not be limitative of the scope of the present disclosure.

Figure 1:
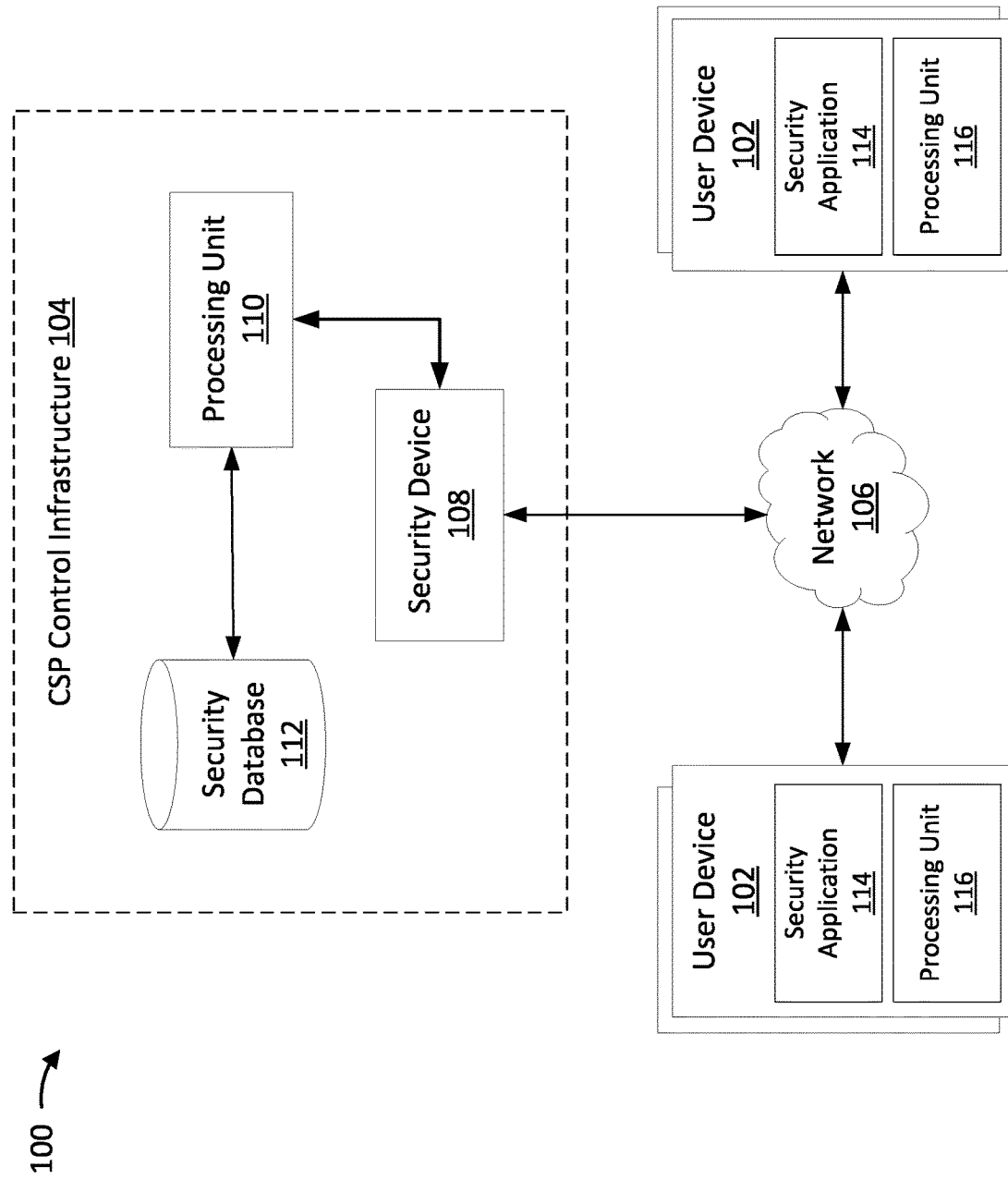

FIG. 1 is an illustration of an example system associated with group verification of a transmission source, according to various aspects of the present disclosure.

Figure 2:
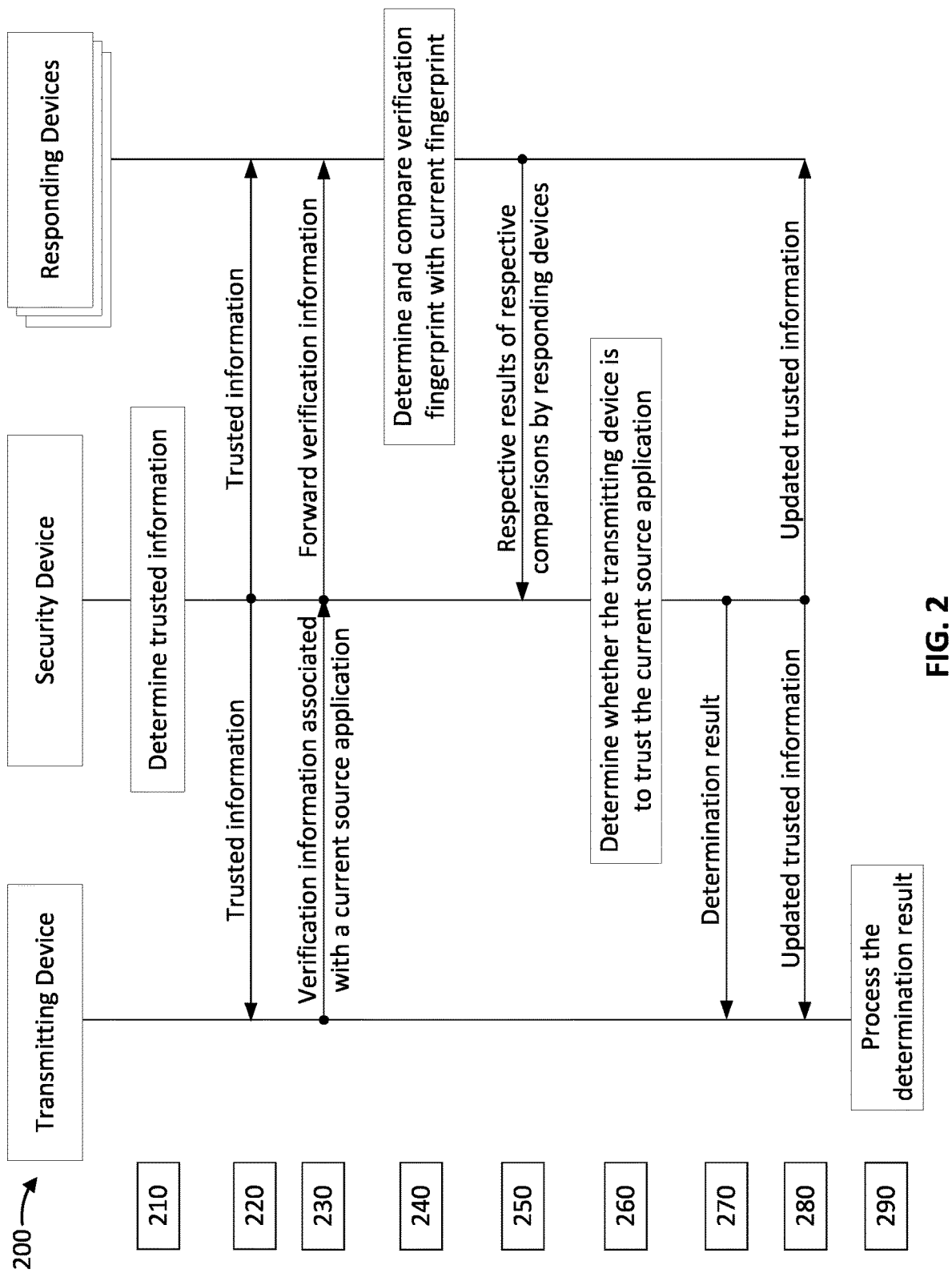

FIG. 2 is an illustration of an example flow associated with group verification of a transmission source, according to various aspects of the present disclosure.

Figure 3:
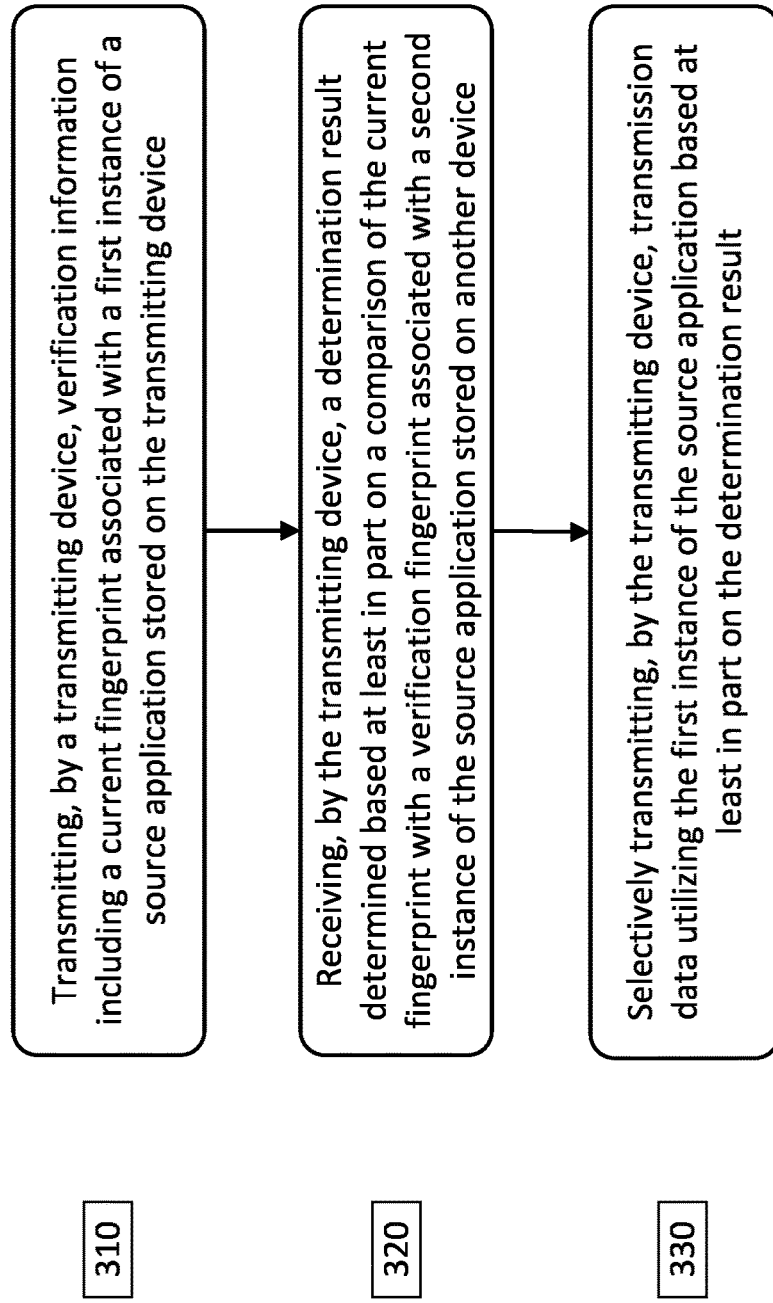

FIG. 3 is an illustration of an example process associated with group verification of a transmission source, according to various aspects of the present disclosure.

Figure 4:
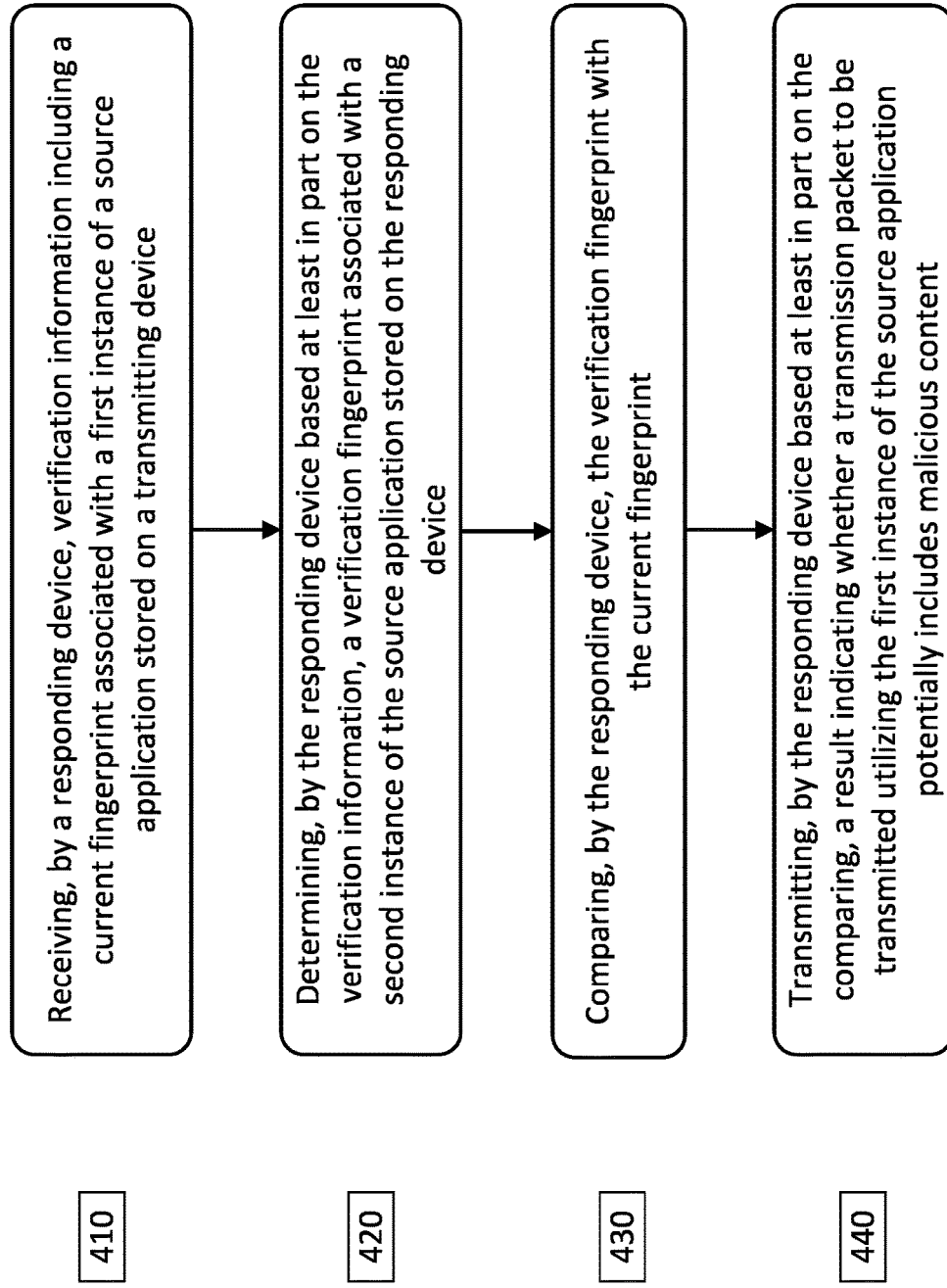

FIG. 4 is an illustration of an example process associated with group verification of a transmission source, according to various aspects of the present disclosure.

Figure 5:
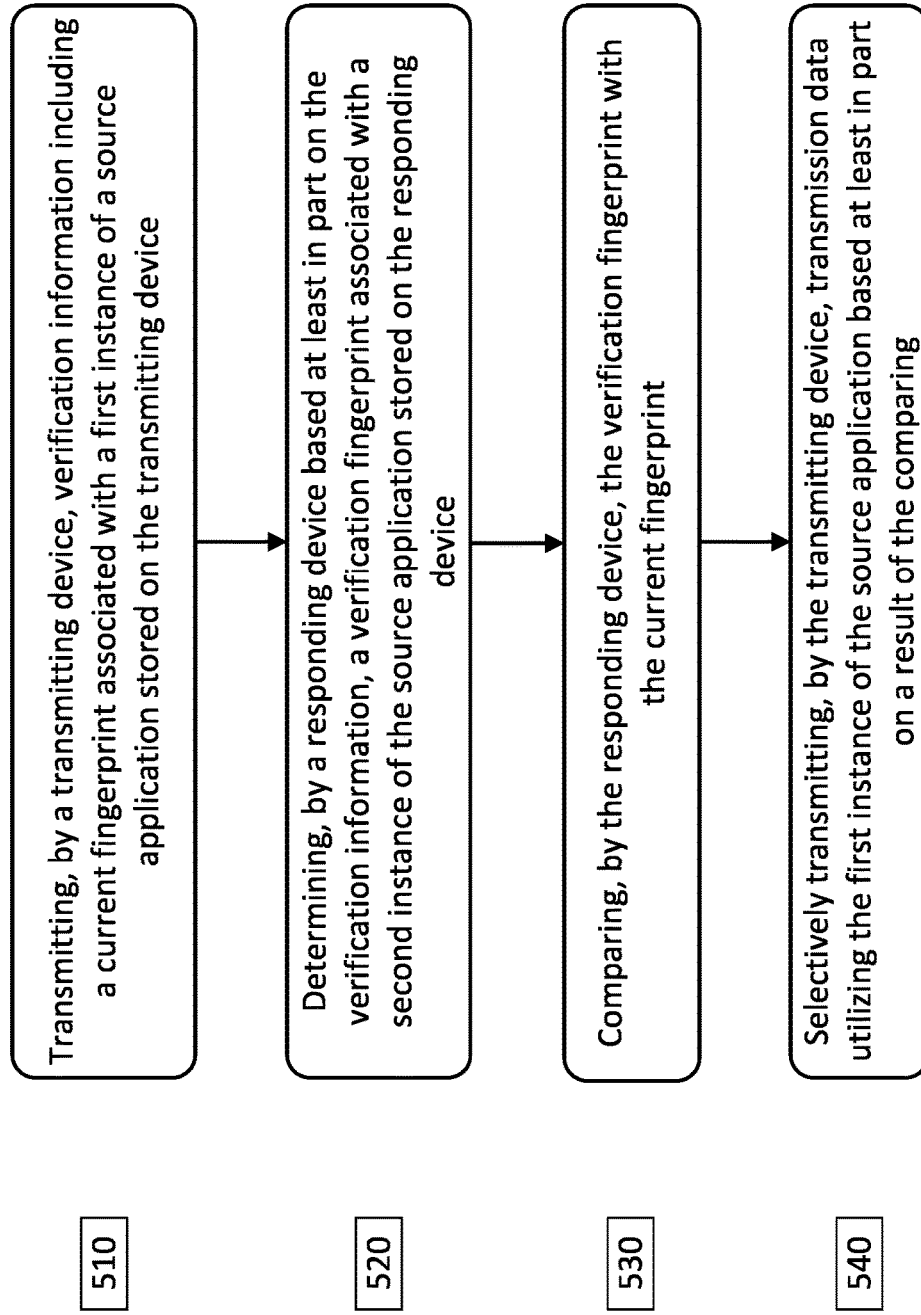

FIG. 5 is an illustration of an example process associated with group verification of a transmission source, according to various aspects of the present disclosure.

Figure 6:
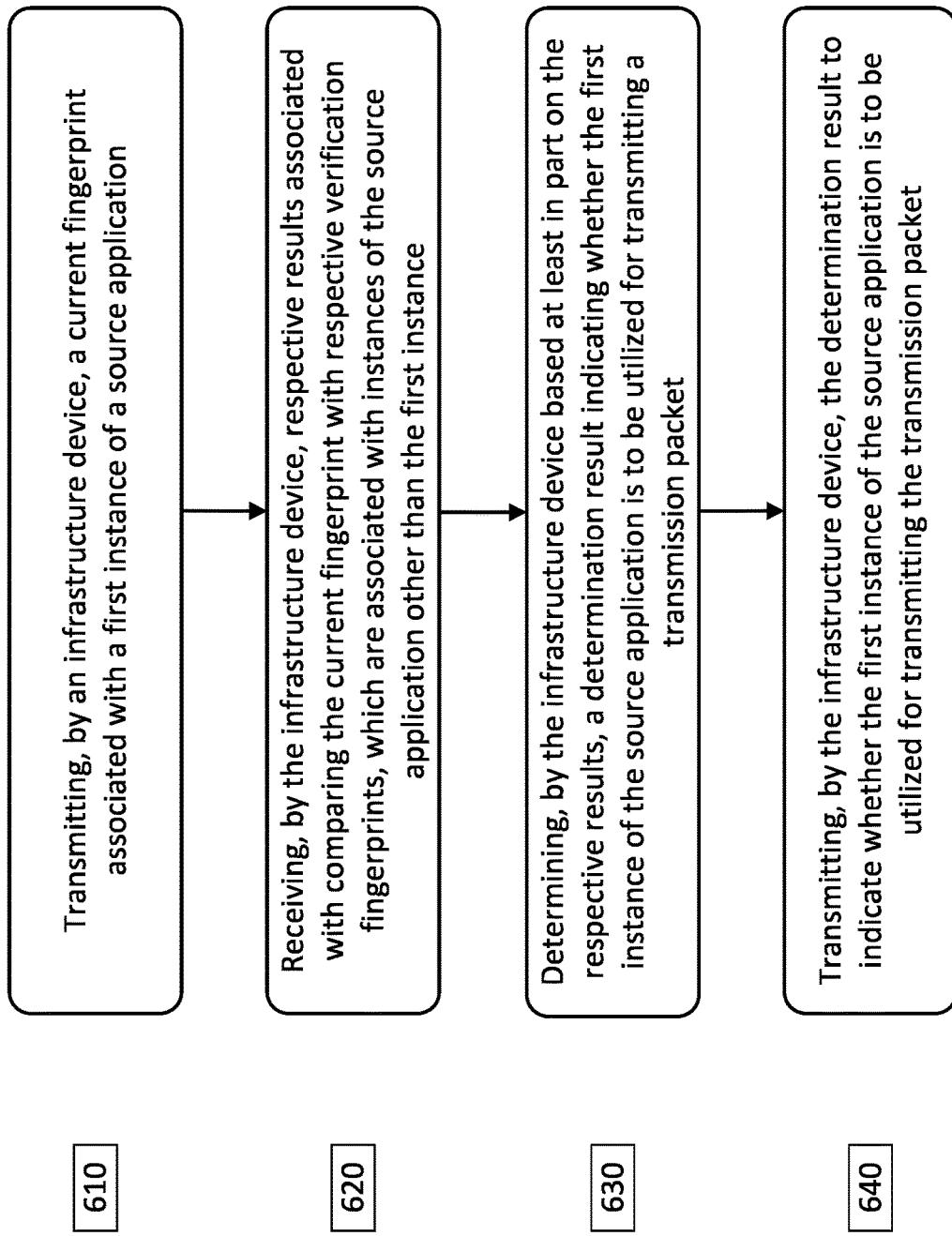

FIG. 6 is an illustration of an example process associated with group verification of a transmission source, according to various aspects of the present disclosure.

Figure 7:
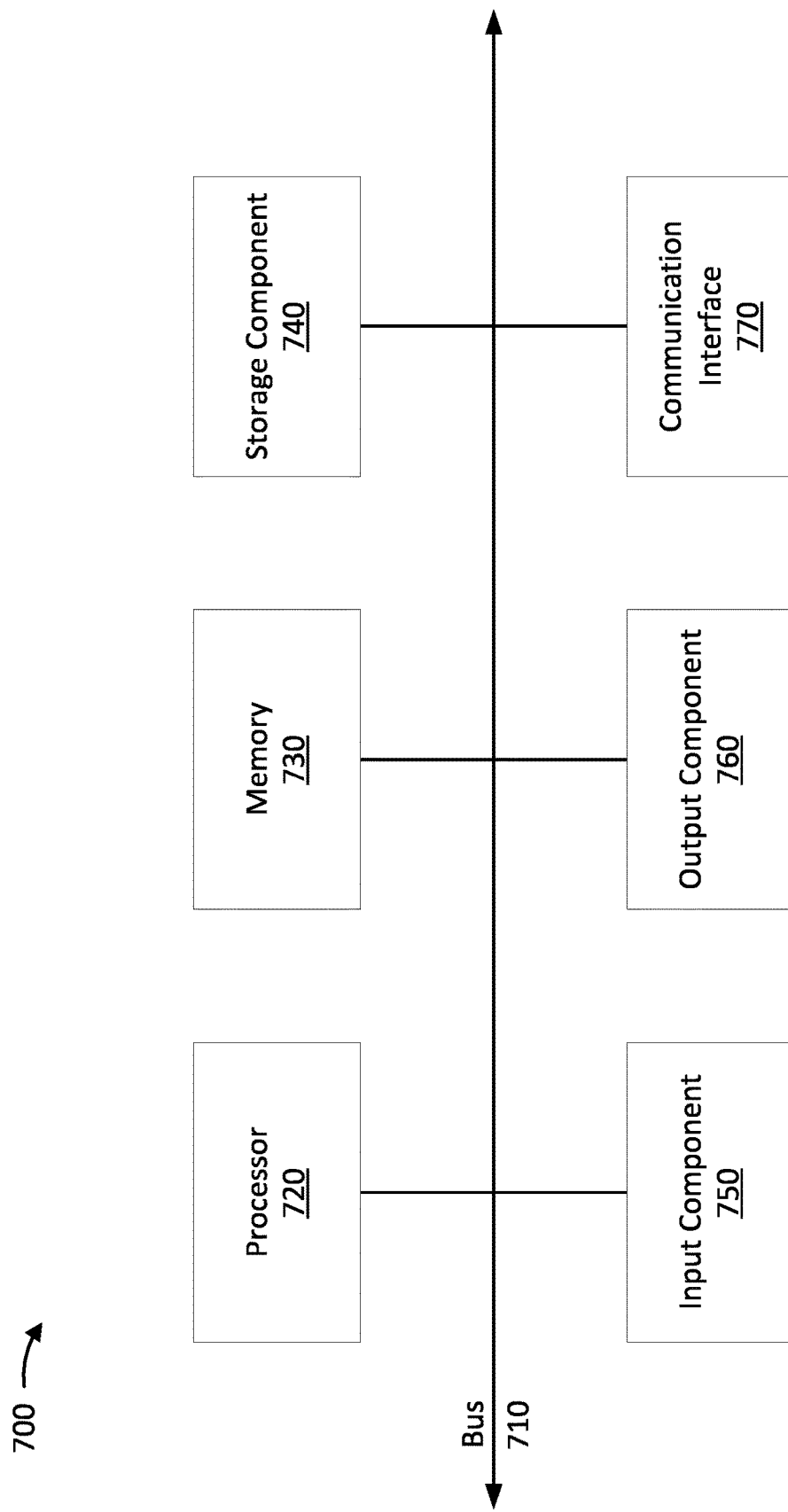

FIG. 7 is an illustration of example devices associated with group verification of a transmission source, according to various aspects of the present disclosure.

DETAILED DESCRIPTION

For the purposes of promoting an understanding of the principles of the present disclosure, reference will now be made to the aspects illustrated in the drawings, and specific language may be used to describe the same. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In particular, it is fully contemplated that the features, components, and/or steps described with respect to one aspect may be combined with the features, components, and/or steps described with respect to other aspects of the present disclosure. For the sake of brevity, however, the numerous iterations of these combinations may not be described separately. For simplicity, in some instances the same reference numbers are used throughout the drawings to refer to the same or like parts.

FIG. 1 is an illustration of an example 100 associated with group verification of a transmission source, according to various aspects of the present disclosure. Example 100 shows an architectural depiction of included components. In some aspects, the components may include one or more user devices 102 in communication with a cyber security service provider (CSP) control infrastructure 104 for purposes of obtaining cyber security services. The one or more user devices 102 and the CSP control infrastructure 104 may communicate over a network 106. The CSP control infrastructure 104 may include a security device 108, a processing unit 110, and a security database 112. The CSP control infrastructure 104 may be owned and operated by a cyber security service provider. The security device 108 may be configured to communicate with the one or more user devices 102 and may be communicatively coupled to the processing unit 110. Additionally, the processing unit 110 may be communicatively coupled to the security database 112, which may be capable of storing data associated with providing the cyber security services.

A user device 102 may include a security application 114 and a processing unit 116. The user device 102 may receive the security application 114 from the security device 108. In an example, a first user device may communicate with the security device 108 to receive a first security application 114 and a second user device may communicate with the security device 108 to receive a second communication. In some aspects, the security device 108 may configure the security applications 114 to enable group verification of a transmission source, as discussed herein. The first user device 102 may utilize the first security application 114 and the second user device 102 may utilize the second security application 114 to communicate (e.g., transmit and/or receive) with the security device and/or each other.

The one or more user devices 102 may be physical computing devices capable of hosting applications (e.g., security applications 114, third-party applications, etc.) and of connecting to the network 106. The one or more user devices 102 may include, for example, a laptop, a mobile phone, a tablet computer, a desktop computer, a smart device, a router, or the like. In some aspects, the one or more user devices 102 may include, for example, Internet-of-Things (IoT) devices such as MSP smart home appliances, smart home security systems, autonomous vehicles, smart health monitors, smart factory equipment, wireless inventory trackers, biometric cyber security scanners, or the like. In some aspects, the one or more user devices 102 may include a server computer.

The network 106 may be any wired or wireless digital telecommunication network that permits several nodes to share and access resources. In some aspects, the network 106 may include a combination of one or more of, for example, a local-area network (LAN), a wide-area network (WAN), a campus-area network (CAN), a metropolitan-area network (MAN), a home-area network (HAN), Internet, Intranet, Extranet, and Internetwork.

The processing unit 110 may be a logical unit including a logical component configured to perform complex operations associated with computing, for example, numerical weights related to various factors associated with providing the cyber security services. The processing unit 110 included in the CSP control infrastructure 104 may be configured to configure the security device 108 to provide the cyber security services to the one or more user devices 102.

The CSP control infrastructure 104 may include a combination of hardware and software components that enable provision of cyber security services to the one or more user devices 102. The CSP control infrastructure 104 may interface with the one or more user devices 102 via an application programming interface (API) (not shown), which may include one or more endpoints to a defined request-response message system. In some aspects, the API may be configured to receive, via the network 106, a connection request from the one or more user devices 102 to establish a connection with the CSP control infrastructure 104 for purposes of obtaining the cyber security services. The connection request may include a request to obtain and install security applications 114 and/or to receive the cyber security services.

The API may further be configured to handle the connection request(s) by mediating the authentication request. For instance, the API may receive from the user device 102 credentials including, for example, a unique combination of a user ID and password for purposes of authenticating the user device 102. In another example, the credentials may include a unique validation code known to an authentic user. The API may provide the received credentials to the processing unit 110 for verification. The processing unit 110 may communicate with the security database 112 to authenticate the user device 102.

The security database 112 may include a structured repository of valid credentials belonging to authentic users. In one example, the structured repository may include one or more tables containing valid unique combinations of user IDs and passwords belonging to authentic users. In another example, the structured repository may include one or more tables containing valid unique validation codes associated with authentic users. The cyber security service provider may add or delete such valid unique combinations of user IDs and passwords from the structured repository at any time. Based at least in part on receiving the credentials from the API, the processor 110 may verify the received credentials by matching the received credentials with the valid credentials stored in the structured repository. In some aspects, the security database 112 and the processing unit 110 may authenticate the user device 102 when the received credentials match at least one of the valid credentials. In this case, the cyber security service provider may provide better security services to the user device 102. When the received credentials fail to match at least one of the valid credentials, the user database 108 and the processor may fail to authenticate the user device 102. In this case, the cyber security service provider may decline to provide cyber security services to the user device 102. Additionally, as discussed below in further detail, the security database 112 may store data associated with providing the cyber security services.

When the user device 102 is authenticated, the user device 102 may initiate a connection with the CSP control infrastructure 104 for obtaining the cyber security services. The processing unit 110 may utilize the security device 108 to transmit information associated with the cyber security services to the user device 102.

One or more components (e.g., security device 108, processing unit 110, and/or security database 112, security application 114, processing unit 116) included in the CSP control infrastructure 104 and/or included in the user device 102, as shown in FIG. 1, may further be associated with a controller/processor, a memory, a communication interface, or a combination thereof (e.g., FIG. 7). For instance, the one or more components may include or may be included in a controller/processor, a memory, or a combination thereof. In some aspects, the one or more components included in the CSP control infrastructure 104 may be separate and distinct from each other. Alternatively, in some aspects, the one or more of the components included in the CSP control infrastructure 104 may be combined with one or more of the other components. In some aspects, the one or more of the components included in the CSP control infrastructure 104 and/or the user device 102 may be local with respect to each other. Alternatively, in some aspects, one or more of the components included in the CSP control infrastructure 104 and/or the user device 102 may be located remotely with respect to one or more of other components included in the CSP control infrastructure 104 and/or the user device 102. Additionally, or alternatively, one or more components of the components included in the CSP control infrastructure 104 and/or the user device 102 may be implemented at least in part as software stored in a memory for execution by a processor. For example, a component (or a portion of a component) may be implemented as instructions or code stored in a non-transitory computer-readable medium and executable by a controller or a processor to perform the functions or operations of the component. Additionally, the one or more components may be configured to perform one or more functions described as being performed by another set of components shown in FIG. 1.

As indicated above, FIG. 1 is provided as an example. Other examples may differ from what is described with regard to FIG. 1.

A CSP control infrastructure may provide cyber security services to user devices related to verifying identities of source applications utilized by the user devices for data communication. In an example, a user device may want to utilize a source application to communicate (e.g., transmit and/or receive) data with a destination device (e.g., user device, server, host device) over a network (e.g., Internet). The source application may include, for example, third-party communication applications such as a web browser, an email client, a messaging client, or a combination thereof.

Utilizing the source application to communicate the data may expose the user device to network vulnerabilities such as, for example, adverse effects regarding operation of the user device. In an example, a malicious party and/or the third-party may include connection malware within the provided third-party communication application. In another example, the malicious party may, in an unauthorized manner, install connection malware on the user device. In these cases, when the user device utilizes the source application to transmit the data, the connection malware may determine and introduce malicious content in the transmitted data. In an example, the malicious content may include access information associated with enabling the malicious party to connect with and, thereby, gain unauthorized access to the user device.

The malicious party may intercept the transmitted data to obtain the access information. Further, the malicious party may utilize the access information to connect with and, thereby, gain unauthorized access to the user device and/or to the CSP control infrastructure providing cyber security services to the user device. The malicious party may install system malware on the user device and/or on devices associated with the CSP control infrastructure (e.g., CSP devices). The system malware may be designed to disrupt and/or damage operation of the user device and/or the CSP devices. In an example, the system malware may embed itself within an operating system of the user device and/or a CSP device and may execute an unauthorized transmission of private information stored in an associated memory. In another example, the system malware may execute an unauthorized deletion of data stored in the associated memory. The system malware may also cause other hindrances by adversely affecting the operating system of the user device and/or the CSP device such that the operating system may run slower and/or associated circuitry may emit excessive heat and/or noise, thereby causing damage to the user device and/or the CSP device.

In such cases, the CSP control infrastructure may expend various infrastructure resources (e.g., processing resources, memory resources, power consumption resources, battery life, or the like) in efforts to mitigate effects of the private information becoming compromised and the hindrances caused by the system malware. Similarly, the user device may expend various user device resources (e.g., processing resources, memory resources, power consumption resources, battery life, or the like) in efforts to mitigate effects of the private information becoming compromised and the hindrances caused by the system malware.

To mitigate the above adverse effects caused by the connection malware and/or the system malware, the CSP control infrastructure may maintain a centralized security database including security information. Such security information may enable the user device to determine whether the data transmitted utilizing the source application may potentially include malicious content. As a result, the user device may avoid utilizing the source application to transmit data that may potentially include malicious content.

In some cases, the centralized security database may become unavailable to the user device. In an example, a server computer associated with retrieving the security information from the centralized security database may become unavailable due to, for example, loss of power, loss of network connectivity, malfunctioning of an operating system associated with the server computer, insufficient processing and/or memory resources, or a combination thereof. In another example, access to the server computer by the user device may be blocked by an entity (e.g., government institution, business institution, educational institution) based at least in part on a current location of the user device. As a result, the user device may be unable to access the centralized database, and, therefore, unable to determine whether the data transmitted utilizing the source application includes malicious content. Consequently, the user device may utilize the source application to transmit the data that includes the malicious content, and, as discussed above, expose the user device to unauthorized access by the malicious party.

Various aspects of systems and techniques discussed in the present disclosure enable group verification of a transmission source. In some aspects, as shown in FIG. 1, a CSP control infrastructure may configure a security device to enable group verification of a transmission source (e.g., a source application), as discussed herein. In some aspects, the security device may maintain a security database including trusted information such as, for example, stored fingerprints that may be associated with trusted source applications known to be in a condition unaffected by malware (e.g., connection malware and/or system malware). Further, the security device may provide the trusted information to the user devices obtaining cyber security services from the CSP control infrastructure. The user devices may store the stored fingerprint information in respective associated memories. The security device may also enable the user devices to install respective security applications to enable the group verification of a source application.

When a transmitting user device is to utilize a current source application to transmit data, the security device may enable the transmitting user device to verify whether the current source application is a trusted application. In some aspects, the transmitting user device may utilize its installed security application to transmit an announcement to the security device requesting verification of the current source application. The announcement may include verification information containing, for example, identification information identifying the current source application and/or a current fingerprint associated with the current source application. The security device may provide the verification information to the user devices obtaining the cyber security services from the CSP control infrastructure. One or more responding user devices, from among the user devices obtaining the cyber security services, that are familiar with the current source application, may respond based at least in part on receiving the verification information. In an example, a responding user device may utilize its respective security application to determine a verification fingerprint based at least in part on an instance of the current source application installed thereon, and may compare the verification fingerprint with the current fingerprint included in the verification information. When a result of the comparison indicates that the verification fingerprint matches the current fingerprint, the responding user device may determine that the current source application is potentially unaffected by malware and/or that the transmitted data may potentially fail to include malicious content. Alternatively, when the result of the comparison indicates that the verification fingerprint fails to match the current fingerprint, the responding user device may determine that the current source application is potentially affected by malware and/or that the transmitted data may potentially include malicious content. The security device may receive responses indicating respective results of the respective comparisons performed by the one or more responding user devices, and may determine whether the transmitting device is to trust the current source application by determining a consensus based at least in part on the respective results. The security device may transmit information regarding whether the transmitting device is to trust the current source application to all user devices obtaining the cyber security services, including the transmitting user device.

In this way, even when the centralized security database is unavailable to the transmitting user device, the security device may enable the transmitting user device to determine whether the transmitting device is to trust the current source application by relying on a group of responding user devices familiar with the current source application. When it is determined that the transmitting device is not to trust the current source application, the transmitting user device may refrain from utilizing the current source application to transmit the data. As a result, the security device and the respective security applications may prevent a malicious party from gaining unauthorized access to the transmitting user device and/or CSP devices. In other words, the security device and the respective security applications may reduce a possibility of private information becoming compromised and/or other hindrances. Additionally, the security device and the respective applications may enable efficient utilization of infrastructure resources (e.g., processing resources, memory resources, power consumption resources, battery life, or the like) and/or user device resources (e.g., processing resources, memory resources, power consumption resources, battery life, or the like) for suitable tasks associated with providing the cyber security services.

In some aspects, a processor (e.g., processing unit 110, processor 620, etc.) may transmit verification information including a current fingerprint associated with a first instance of a source application stored on the transmitting device; receive a determination result determined based at least in part on a comparison of the current fingerprint with a verification fingerprint associated with a second instance of the source application stored on another device; and selectively transmit transmission data utilizing the first instance of the source application based at least in part on the determination result.

FIG. 2 is an illustration of an example flow 200 associated with group verification of a transmission source, according to various aspects of the present disclosure. The example flow 200 may include a transmitting user device in communication with a security device (e.g., security device 108) and one or more responding user devices. In some aspects, the transmitting user device and the one or more responding user devices may be similar to a user device 102, discussed above with respect to FIG. 1. The transmitting user device, the security device, and the one or more responding user devices may communicate with each other over a network (e.g., network 106).

In some aspects, the transmitting user device and the one or more responding user devices may be associated with the security device for purposes of, for example, obtaining cyber security services. To provide the cyber security services, a CSP control infrastructure (e.g., CSP control infrastructure 104) may configure the security device to configure and provide respective security applications to be utilized by the transmitting user device and the one or more user devices. The security device may configure the respective security applications to enable group verification of source applications, as discussed herein.

Further, to provide the cyber security services, as shown by reference numeral 210, the CSP control infrastructure may utilize the security device to determine trusted information and to store the trusted information in, for example, an associated security database (e.g., security database 112). The trusted information may include stored fingerprints correlated with identities of trusted source applications that are known to be in a condition unaffected by malware (e.g., connection malware and/or system malware).

In some aspects, the CSP control infrastructure may utilize the security device to determine the trusted information based at least in part on hashing and/or encrypting connection information indicating one or more parameters associated with the trusted source applications. In an example, during a reference period prior to providing the cyber security services, the security device may receive one or more trusted transmission packets (e.g., transmission data) from one or more trusted source applications. Such one or more trusted transmission packets may include initial connection packets indicating connection information to be utilized to connect with and/or communicate data with the one or more trusted source applications.

Based at least in part on receiving the one or more trusted transmission packets, the security device may determine identities of the one or more trusted source applications. In some aspects, determining an identity of a source application may include determining information identifying the source application. Further, the identity of the source application may be utilized to determine a state of the source application as, for example, being affected by malware or being unaffected by malware.

For a given trusted transmission packet, the security device may determine source information (e.g., source IP address, source port, etc.) associated with a user device that transmitted the transmission packet. The security device may utilize the source information to query a local Internet protocol (IP) table to determine a process identifier associated with a given trusted source application that transmitted the given transmission packet. Based at least in part on an association between the process identifier and the identity of the given trusted source application, the security device may determine the identity of the given trusted source application.

In some aspects, the given trusted transmission packet may include given trusted connection information to enable a destination application associated with a destination device to connect and/or communicate with the given trusted source application. Based at least in part on receiving the given trusted transmission packet, the security device may analyze the given trusted transmission packet to determine the given trusted connection information. In some aspects, the given trusted connection information may indicate information associated with any combination of one or more parameters to be utilized by the given trusted source application and the destination application to connect with and/or communicate with each other.

The one or more parameters may include a cipher suite, a compression method, an elliptic curve (EC), EC point format, a signature algorithm, a certificate timestamp, etc. The cipher suite may identify, for example, one or more encryption algorithms that the destination device may utilize to connect and/or communicate with the user device 102. In some aspects, the one or more encryption algorithms may include, for example, a key exchange algorithm, a bulk encryption algorithm, a message authentication code (MAC) algorithm, etc. The compression method may identify, for example, one or more transport layer security (TLS) compression methods that the destination device may utilize to connect and/or communicate with the user device 102. The elliptic curve may identify, for example, one or more cryptography schemes that are based on algebraic structures of elliptic curves and may be utilized by the destination device to connect and/or communicate with the user device 102. The EC point format may indicate cryptography keys that may be determined based at least in part on pairs of integer coordinates laying on an elliptic curve and may be utilized by the destination device to connect and/or communicate with the user device 102. The signature algorithm may identify, for example, one or more cryptography algorithms that the destination device may utilize to sign messages transmitted by the destination device to the user device 102. The certificate timestamp may identify, for example, one or more types of certificate timestamps to be signed and transmitted by the destination device while connecting and/or communicating with the user device 102.

Based at least in part on determining the given trusted connection information, the security device may determine a given trusted fingerprint associated with the given trusted source application. In an example, the security device may determine the given trusted fingerprint by hashing and/or encrypting a combination of the one or more parameters. Based at least in part on determining the given trusted fingerprint and/or determining the identity of the given trusted source application, the security device may store, as trusted information, a correlation between the identity of the given trusted source application and the given trusted fingerprint.

The security device may likewise store, as trusted information, correlations between identities of the one or more trusted source applications and respective trusted fingerprints. For example, the security device may store, as trusted information, a first correlation between a first identity of a first trusted source application and a first trusted fingerprint, a second correlation between a second identity of a second trusted source application and a second trusted fingerprint, and so on. In some aspects, the security device may store the trusted information in, for example, the security database accessible to the security device.

As shown by reference numeral 220, the security device may transmit the trusted information to the user devices obtaining the cyber security services. Such user devices may include, for example, the transmitting user device and the one or more responding user devices. The user devices may store the received trusted information in respective memories associated with the user devices. Such respective memories may be located locally or remotely with respect to the user devices.

In some aspects, the transmitting user device may install instances of source applications to be utilized to communicate with the security device and/or one or more responding user devices. The source applications may include third party applications such as, for example, email clients (e.g., Outlook application, Gmail application, etc.), web browsers (e.g., Firefox, Chrome, Internet Explorer, etc.), messaging clients (e.g., Slack, Facebook messenger, etc.), social media applications (e.g., Facebook, Instagram, etc.), or the like.

While obtaining the cyber security services during an operation period, as shown by reference numeral 230, the transmitting device may wish to utilize an instance (e.g., first instance) of a current source application to transmit a current transmission packet. The current transmission packet may include an initial transmission packet indicating current connection information to be utilized to connect with and/or communicate data with the current source application. The current connection information may include connection information. For instance, the current connection information may indicate one or more parameters including a cipher suite, a compression method, an elliptic curve (EC), EC point format, a signature algorithm, a certificate timestamp, etc. to be utilized to connect with and/or communicate data with the current source application, as discussed elsewhere herein.

In some aspects, prior to transmitting the current transmission packet, the transmitting user device may utilize the security application to determine whether the transmitting user device is to trust the current source application. In an example, the transmitting user device may determine whether the current transmission packet may potentially include malicious content.

To determine whether the transmitting user device is to trust the current source application, the transmitting user device may determine an identity of the current source application, as discussed elsewhere herein. Based at least in part on determining the identity of the current source application, the transmitting user device may compare the identity of the current source application with identities of trusted source applications stored in the trusted information. When the identity of the current source application matches an identity of a trusted source application, the transmitting user device may determine that the current source application is a trusted source application and/or that the transmitting user device is to trust the current source application. In this case, the transmitting user device may proceed to transmit the current transmission packet. Alternatively, when the identity of the current source application fails to match an identity of a trusted source application, the transmitting user device may determine that the current source application has not yet been verified as a trusted source application and/or that the transmitting user device is not yet to trust the current source application. In this case, the transmitting user device may refrain from transmitting the current transmission packet. Further, the transmitting user device may rely on group verification of the current source application.

For instance, as shown by reference numeral 230, the transmitting user device may determine and transmit verification information associated with the current source application to the security device. The verification information may include, for example, identification information associated with the determined identity of the current source application and/or a current fingerprint associated with the current source application. In some aspects, the transmitting user device may determine the current fingerprint based at least in part on hashing and/or encrypting the one or more parameters indicated by the current connection information, as discussed elsewhere herein. In some aspects, the verification information may include an encryption list identifying the one or more parameters that were hashed and/or encrypted to determine the current fingerprint.

Based at least in part on receiving the verification information from the transmitting user device, as also shown by reference numeral 230, the security device may forward (e.g., transmit) the verification information to all user devices (except the transmitting user device) obtaining the cyber security services. The user devices may utilize the identification information included in the verification information to determine whether the user devices are familiar with the current source application. In an example, a given user device may be familiar with the current source application when the given user device has an instance (e.g., second instance) of the current source application installed on the given user device. In this case, the given user device may operate as a responding user device.

In some aspects, even though one or more responding user devices may be familiar with by way of installing instances of the current source application, the current source application may not have been previously verified because, for example, the one or more responding user devices may have yet to utilize the current source application to transmit data and/or the one or more user devices may have utilized the current source application to transmit data without relying on the group verification and/or the one or more user devices may have utilized the current source application to transmit data prior to obtaining the cyber security services from the security device and/or the CSP control infrastructure.

Based at least in part on determining familiarity with the current source application, as shown by reference numeral 240, one or more responding user devices may determine and compare respective verification fingerprints with the current fingerprint. In an example, to determine a given verification fingerprint, a given responding user device, from among the one or more responding user devices, may utilize its security application to determine a given verification packet to be transmitted by the instance of the current source application installed on the given responding user device. In some aspects, the instance of the current source application installed on the given responding user device may be trusted to be unaffected by malware.

The given verification packet may include given connection information indicating one or more parameters to be utilized to connect and/or communicate with the instance of the current source application installed on the given responding user device. The given responding user device may utilize its security application to hash and/or encrypt the one or more parameters to determine a given verification fingerprint, as discussed elsewhere herein. In some aspects, the given responding user device may utilize its security application to hash and/or encrypt the one or more parameters identified in the encryption list included in the verification information.

The given responding user device may compare the given verification fingerprint with the current fingerprint included in the verification information. When the given verification fingerprint fails to match the current fingerprint, the given responding user device may determine a result indicating that the current source application is potentially affected by malware and/or that the current transmission packet may potentially include malicious content. Alternatively, when the given verification fingerprint matches the current fingerprint, the given user device may determine a result indicating that the current source application is potentially unaffected by malware and/or that the current transmission packet may potentially fail to include malicious content.

In a similar and/or analogous manner, other responding user devices, from among the one or more responding user devices, may determine respective results indicating that the current source application is potentially affected by malware and/or that the current transmission packet may potentially include malicious content or indicating that the current source application is potentially unaffected by malware and/or that the current transmission packet may potentially fail to include malicious content. As shown by reference numeral 250, the one or more responding user devices may transmit the respective results of the respective comparisons to the security device.

Based at least in part on receiving the respective results, as shown by reference numeral 260, the security device may determine whether the transmitting device is to trust the current source application. In an example, the security device may make such a determination based at least in part on determining whether a predetermined amount (e.g., 51%, 66%, 75%, 90%, or 100%) of respective results indicates that the current source application is potentially affected by malware and/or that the current transmission packet may potentially include malicious content or indicates that the current source application is potentially unaffected by malware and/or that the current transmission packet may potentially fail to include malicious content. For instance, when the security device determines that the predetermined amount of respective results indicates that the current source application is potentially affected by malware and/or that the current transmission packet may potentially include malicious content, the security device may determine that the transmitting user device is not to trust the current source application. Alternatively, when the security device determines that the predetermined amount of respective results indicates that the current source application is potentially unaffected by malware and/or that the current transmission packet may potentially fail to include malicious content, the security device may determine that the transmitting user device is to trust the current source application.

In some aspects, the security device may assign weights to the respective results to determine whether the predetermined amount is satisfied. The security device may assign such weights based at least in part on duration of time for which a responding user device may be associated with the security device and/or with the CSP control infrastructure. In an example, the security device may assign a higher weight to a first responding user device that has been associated with the security device and/or with the CSP control infrastructure for a first duration of time, and may assign a lower weight to a second responding user device that has been associated with the security device and/or with the CSP control infrastructure for a second duration of time, the first duration of time being longer than the second amount of time. Based at least in part on assigning the weights to the respective results, the security device may determine whether the predetermined amount of respective results indicates that the current source application is potentially affected by malware and/or that the current transmission packet may potentially include malicious content or indicates that the current source application is potentially unaffected by malware and/or that the current transmission packet may potentially fail to include malicious content.

Further, the security device may update a weight previously assigned to a responding user device based at least in part on determining, at a later time, that the respective result provided by the responding user device was incorrect. In an example, when the respective result provided by the responding user device indicates that the current source application is potentially unaffected by malware and/or that the current transmission packet may potentially fail to include malicious content, and it is discovered, after transmission of the current transmission packet by the transmitting user device, that the current source application was actually affected by malware and/or that the current transmission packet actually included malicious content, the security device may update the weight previously assigned to the responding user device by assigning a new weight that is lower than the previously assigned weight. In another example, when the respective results provided by the responding user device indicates that the current source application is potentially affected by malware and/or that the current transmission packet may potentially include malicious content, and it is discovered later on that the current source application was actually unaffected by malware and/or that the current transmission packet failed to actually include malicious content, the security device may update the weight previously assigned to the responding user device by assigning a new weight that is lower than the previously assigned weight. In some aspects, the security device may update the weight previously assigned to the responding user device based at least in part on resetting (e.g., to zero) the duration of time for which the responding user device is associated with the security device and/or with the CSP control infrastructure.

As shown by reference numeral 270, the security device may transmit a determination result to the transmitting user device. In some aspects, the determination result may indicate whether the transmitting user device is to trust the current source application. In an example, based at least in part on determining that the predetermined amount (e.g., 51%, 66%, 75%, 90%, or 100%) of respective results indicates that the current source application is potentially affected by malware and/or that the current transmission packet may potentially include malicious content, the security device may determine that the transmitting user device is not to trust the current source application. In this case, the determination result may indicate that the transmitting user device is not to trust the current source application such that the transmitting user device may refrain from utilizing the current source application to transmit the current transmission packet. Alternatively, based at least in part on determining that the predetermined amount (e.g., 51%, 66%, 75%, 90%, or 100%) of respective results indicates that the current source application is potentially unaffected by malware and/or that the current transmission packet may potentially fail to include malicious content, the security device may determine that the transmitting user device is to trust the current source application. In this case, the determination result may indicate that the transmitting user device is to trust the current source application such that the transmitting user device may utilize the current source application to transmit the current transmission packet.

Further, as shown by reference numeral 280, the security device may selectively update the trusted information stored in the security database 112, and may transmit the updated trusted information to all user devices obtaining the cyber security services. For instance, as discussed above, the security device may determine, based at least in part on the predetermined amount of respective results, that the current source application is potentially unaffected by malware and/or that the current transmission packet may potentially fail to include malicious content. In this case, the security device may determine that the trusted information stored in this security database 112 is to be updated to include an association of the current fingerprint with the identity of the current source application. In other words, the security device may determine that the current source application is a trusted application. As a result, the security device may store the association of the current fingerprint with the identity of the current source application as trusted information in the security database 112. In this case, the security device may select to transmit the updated trusted information, including the association of the current fingerprint with the identity of the current source application, to all devices obtaining the cyber security services.

As shown by reference numeral 290, the transmitting user device may process the determination result received from the security device. For instance, when the determination result indicates that the transmitting user device is not to trust the current source application, the transmitting user device may refrain from utilizing the current source application to transmit the current transmission packet. Further, the transmitting user device may discard and/or uninstall the current source application and delete associated data (e.g., current transmission packet, current fingerprint, etc.). Alternatively, when the determination result indicates that the transmitting user device is to trust the current source application, the transmitting user device may utilize the current source application to transmit the current transmission packet.

In this way, even when the centralized security database is unavailable to the transmitting user device, the security device may enable the transmitting user device to determine whether the transmitting device is to trust the current source application by relying on a group of responding user devices familiar with the current source application. When it is determined that the transmitting device is not to trust the current source application, the transmitting user device may determine that the current source application may be affected by malware and may avoid utilizing the current source application to transmit the data. As a result, the security device and the respective security applications may prevent a malicious party from gaining unauthorized access to the transmitting user device and/or CSP devices. In other words, the security device and the respective security applications may reduce a possibility of private information becoming compromised and/or other hindrances. Additionally, the security device and the respective applications may enable efficient utilization of infrastructure resources (e.g., processing resources, memory resources, power consumption resources, battery life, or the like) and/or user device resources (e.g., processing resources, memory resources, power consumption resources, battery life, or the like) for suitable tasks associated with providing the cyber security services.

As indicated above, FIG. 2 is provided as an example. Other examples may differ from what is described with regard to FIG. 2.

FIG. 3 is an illustration of an example process 300 associated with group verification of a transmission source, according to various aspects of the present disclosure. In some aspects, the process 300 may be performed by a memory and/or a processor/controller (e.g., processing unit 116, processor 720) associated with a transmitting device (e.g., user device 102). As shown by reference numeral 310, process 300 may include transmitting, by a transmitting device, verification information including a current fingerprint associated with a first instance of a source application stored on the transmitting device. For instance, the transmitting device may utilize an associated communication interface (e.g., communication interface 770) with the associated memory and/or processor to transmit verification information including a current fingerprint associated with a first instance of a source application stored on the transmitting device, as discussed elsewhere herein.

As shown by reference numeral 320, process 300 may include receiving, by the transmitting device, a determination result determined based at least in part on a comparison of the current fingerprint with a verification fingerprint associated with a second instance of the source application stored on another device. For instance, the transmitting device may utilize the associated communication interface, memory, and/or processor to receive a determination result determined based at least in part on a comparison of the current fingerprint with a verification fingerprint associated with a second instance of the source application stored on another device, as discussed elsewhere herein.

As shown by reference numeral 330, process 300 may include selectively transmitting, by the transmitting device, transmission data utilizing the first instance of the source application based at least in part on the determination result. For instance, the transmitting device may utilize the associated communication interface, memory, and/or processor to selectively transmit transmission data utilizing the first instance of the source application based at least in part on the determination result, as discussed elsewhere herein.

Process 300 may include additional aspects, such as any single aspect or any combination of aspects described below and/or in connection with one or more other processes described elsewhere herein.

In a first aspect, in process 300, the verification information includes an encryption list indicating one or more parameters utilized to determine the current fingerprint.

In a second aspect, alone or in combination with the first aspect, in process 300, selectively transmitting the transmission data includes transmitting the transmission data utilizing the first instance of the source application when the determination result indicates that current fingerprint matches the verification fingerprint.

In a third aspect, alone or in combination with the first through second aspects, in process 300, selectively transmitting the transmission data includes refraining from transmitting the transmission data utilizing the first instance of the source application when the determination result indicates that current fingerprint fails to match the verification fingerprint.

In a fourth aspect, alone or in combination with the first through third aspects, process 300 may include determining the current fingerprint based at least in part on encrypting connection information indicating one or more parameters associated with connecting with the first instance of the source application.

In a fifth aspect, alone or in combination with the first through fourth aspects, process 300 may include comparing identification information identifying the first instance of the source application with identification information identifying a trusted source application known to be in a state unaffected by malware.

In a sixth aspect, alone or in combination with the first through fifth aspects, process 300 may include storing, in an associated memory, trusted information including an association between a trusted fingerprint and identification information identifying a trusted source application known to be in a state unaffected by malware.

Although FIG. 3 shows example blocks of the process, in some aspects, the process may include additional blocks, fewer blocks, different blocks, or differently arranged blocks than those depicted in FIG. 3. Additionally, or alternatively, two or more of the blocks of the process may be performed in parallel.

As indicated above, FIG. 3 is provided as an example. Other examples may differ from what is described with regard to FIG. 3.

FIG. 4 is an illustration of an example process 300 associated with group verification of a transmission source, according to various aspects of the present disclosure. In some aspects, the process 300 may be performed by a memory and/or a processor/controller responding (e.g., processing unit 116, processor 720) associated with a responding device (e.g., user device 102). As shown by reference numeral 410, process 400 may include receiving, by a responding device, verification information including a current fingerprint associated with a first instance of a source application stored on a transmitting device. For instance, the responding device may utilize a communication interface (e.g., communication interface 770) with the associated memory and/or processor to receive verification information including a current fingerprint associated with a first instance of a source application stored on a transmitting device, as discussed elsewhere herein.

As shown by reference numeral 420, process 400 may include determining, by the responding device based at least in part on the verification information, a verification fingerprint associated with a second instance of the source application stored on the responding device. For instance, the responding device may utilize the associated memory and/or processor to determine, based at least in part on the verification information, a verification fingerprint associated with a second instance of the source application stored on the responding device, as discussed elsewhere herein.

As shown by reference numeral 430, process 400 may include comparing, by the responding device, the verification fingerprint with the current fingerprint. For instance, the responding device may utilize the associated memory and/or processor to compare the verification fingerprint with the current fingerprint, as discussed elsewhere herein.

As shown by reference numeral 440, process 400 may include transmitting, by the responding device based at least in part on the comparing, a result indicating whether a transmission packet to be transmitted utilizing the first instance of the source application potentially includes malicious content. For instance, the responding device may utilize the associated communication interface, memory, and/or processor to transmitting, by the responding device based at least in part on the comparing, a result indicating whether a transmission packet to be transmitted utilizing the first instance of the source application potentially includes malicious content, as discussed elsewhere herein.

Process 400 may include additional aspects, such as any single aspect or any combination of aspects described below and/or in connection with one or more other processes described elsewhere herein.

In a first aspect, in process 400, receiving the verification information includes receiving identification information identifying the source application.

In a second aspect, alone or in combination with the first aspect, in process 400, determining the verification fingerprint includes encrypting information associated with one or more parameters indicated in the verification information as being utilized to determine the current fingerprint.

In a third aspect, alone or in combination with the first through second aspects, in process 400, determining the verification fingerprint includes encrypting connection information indication one or more parameters to be utilized to connect with the second instance of the source application.

In a fourth aspect, alone or in combination with the first through third aspects, in process 400, transmitting the result includes transmitting the result indicating that the transmission packet to be transmitted utilizing the first instance of the source application potentially includes malicious content when the verification fingerprint fails to match the current fingerprint.

In a fifth aspect, alone or in combination with the first through fourth aspects, in process 400, transmitting the result includes transmitting the result indicating that the transmission packet to be transmitted utilizing the first instance of the source application potentially fails to include malicious content when the verification fingerprint matches the current fingerprint.

In a sixth aspect, alone or in combination with the first through fifth aspects, process 400 may include determining whether the responding device is familiar with the source application based at least in part on identification information included in the verification information.

Although FIG. 4 shows example blocks of the process, in some aspects, the process may include additional blocks, fewer blocks, different blocks, or differently arranged blocks than those depicted in FIG. 4. Additionally, or alternatively, two or more of the blocks of the process may be performed in parallel.

As indicated above, FIG. 4 is provided as an example. Other examples may differ from what is described with regard to FIG. 4.

FIG. 5 is an illustration of an example process 500 associated with group verification of a transmission source, according to various aspects of the present disclosure. In some aspects, the process 500 may be performed by one or more memories and/or processors/controllers (e.g., processing unit 116, processor 720) associated with a transmitting device and/or a responding device (e.g., user devices 102).

As shown by reference numeral 510, process 500 may include transmitting, by a transmitting device, verification information including a current fingerprint associated with a first instance of a source application stored on the transmitting device. For instance, the transmitting device may utilize an associated communication interface (e.g., communication interface) with the associated memory and/or processor to transmit verification information including a current fingerprint associated with a first instance of a source application stored on the transmitting device, as discussed elsewhere herein.

As shown by reference numeral 520, process 500 may include determining, by a responding device based at least in part on the verification information, a verification fingerprint associated with a second instance of the source application stored on the responding device. For instance, the responding device may utilize the associated memory and/or processor to determine, based at least in part on the verification information, a verification fingerprint associated with a second instance of the source application stored on the responding device, as discussed elsewhere herein.

As shown by reference numeral 530, process 500 may include comparing, by the responding device, the verification fingerprint with the current fingerprint. For instance, the responding device may utilize the associated memory and/or processor to compare the verification fingerprint with the current fingerprint, as discussed elsewhere herein.

As shown by reference numeral 540, process 500 may include selectively transmitting, by the transmitting device, transmission data utilizing the first instance of the source application based at least in part on a result of the comparing. For instance, the transmitting device may utilize the associated communication interface, memory, and/or processor to selectively transmit transmission data utilizing the first instance of the source application based at least in part on a result of the comparing, as discussed elsewhere herein.

Process 500 may include additional aspects, such as any single aspect or any combination of aspects described below and/or in connection with one or more other processes described elsewhere herein.

In a first aspect, in process 500, selectively transmitting the transmission data includes the transmitting device transmitting the transmission data utilizing the first instance of the source application when the result indicates that the current fingerprint matches the verification fingerprint.

In a second aspect, alone or in combination with the first aspect, in process 500, selectively transmitting the transmission data includes the transmitting device refraining from transmitting the transmission data utilizing the first instance of the source application when the result indicates that current fingerprint fails to match the verification fingerprint.

In a third aspect, alone or in combination with the first through second aspects, in process 500, the verification information includes identification information identifying the source application.

In a fourth aspect, alone or in combination with the first through third aspects, in process 500, the current fingerprint and the verification fingerprint include encrypted information associated with a given combination of one or more parameters.

In a fifth aspect, alone or in combination with the first through fourth aspects, in process 500, comparing the current fingerprint with the verification fingerprint includes the responding device comparing hashed information associated with the current fingerprint with hashed information associated with the verification fingerprint.

In a sixth aspect, alone or in combination with the first through fifth aspects, process 500 may include determining, by the transmitting device, whether the transmission data potentially includes malicious content based at least in part on the result of the comparing.

Although FIG. 5 shows example blocks of the process, in some aspects, the process may include additional blocks, fewer blocks, different blocks, or differently arranged blocks than those depicted in FIG. 5. Additionally, or alternatively, two or more of the blocks of the process may be performed in parallel.

As indicated above, FIG. 5 is provided as an example. Other examples may differ from what is described with regard to FIG. 5.

FIG. 6 is an illustration of an example process 600 associated with group verification of a transmission source, according to various aspects of the present disclosure. In some aspects, the process 600 may be performed by a memory and/or processor (e.g., processing unit 110, processor 720) associated with an infrastructure device (e.g., security device 108). As shown by reference numeral 610, process 600 may include transmitting, by an infrastructure device, a current fingerprint associated with a first instance of a source application. For instance, the infrastructure device may utilize an associated communication interface (e.g., communication interface 770) with the associated memory and/or processor to transmit a current fingerprint associated with a first instance of a source application, as discussed elsewhere herein.

As shown by reference numeral 620, process 600 may include receiving, by the infrastructure device, respective results associated with comparing the current fingerprint with respective verification fingerprints, which are associated with instances of the source application other than the first instance. For instance, the infrastructure device may utilize the associated communication interface, memory, and/or processor to receive respective results associated with comparing the current fingerprint with respective verification fingerprints, which are associated with instances of the source application other than the first instance, as discussed elsewhere herein.

As shown by reference numeral 630, process 600 may include determining, by the infrastructure device based at least in part on the respective results, a determination result indicating whether the first instance of the source application is to be utilized for transmitting a transmission packet. For instance, the infrastructure device may utilize the associated memory and/or processor to determine, based at least in part on the respective results, a determination result indicating whether the first instance of the source application is to be utilized for transmitting a transmission packet, as discussed elsewhere herein.

As shown by reference numeral 640, process 600 may include transmitting, by the infrastructure device, the determination result to indicate whether the first instance of the source application is to be utilized for transmitting the transmission packet. For instance, the infrastructure device may utilize the associated communication interface, memory, and/or processor to transmit the determination result to indicate whether the first instance of the source application is to be utilized for transmitting the transmission packet, as discussed elsewhere herein.

Process 600 may include additional aspects, such as any single aspect or any combination of aspects described below and/or in connection with one or more other processes described elsewhere herein.

In a first aspect, in process 600, determining the determination result includes determining whether a predetermined amount of the respective results indicates that the first instance of the source application is potentially affected by malware.

In a second aspect, alone or in combination with the first aspect, in process 600, determining the determination result includes determining whether a predetermined amount of the respective results indicates that the transmission packet potentially includes malicious content.

In a third aspect, alone or in combination with the first through second aspects, in process 600, determining the determination result includes determining whether a predetermined amount of the respective results indicates that the first instance of the source application is potentially unaffected by malware.

In a fourth aspect, alone or in combination with the first through third aspects, in process 600, determining the determination result includes determining whether a predetermined amount of the respective results indicates that the transmission packet potentially fails to include malicious content.

In a fifth aspect, alone or in combination with the first through fourth aspects, in process 600, determining the determination result includes assigning weights to the respective results to determine weighted respective results, and determining whether a predetermined amount of the weighted respective results indicates that the first instance of the source application is potentially unaffected by malware or that the transmission packet potentially fails to include malicious content.

In a sixth aspect, alone or in combination with the first through fifth aspects, process 600 may include determining trusted information associated with trusted instances of trusted source applications; and updating the trusted information to include information associated with the first instance of the source application based at least in part on determining that the first instance of the source application is to be utilized for transmitting the transmission packet.

Although FIG. 6 shows example blocks of the process, in some aspects, the process may include additional blocks, fewer blocks, different blocks, or differently arranged blocks than those depicted in FIG. 6. Additionally, or alternatively, two or more of the blocks of the process may be performed in parallel.

As indicated above, FIG. 6 is provided as an example. Other examples may differ from what is described with regard to FIG. 6.

FIG. 7 is an illustration of example devices 700 associated with group verification of a transmission source, according to various aspects of the present disclosure. In some aspects, the example devices 700 may form part of or implement the systems, servers, environments, infrastructures, components, devices, or the like described elsewhere herein (e.g., CSP control infrastructure, VPN server, etc.) and may be used to perform example processes described elsewhere herein. The example devices 700 may include a universal bus 710 communicatively coupling a processor 720, a memory 730, a storage component 740, an input component 750, an output component 760, and a communication interface 770.

Bus 710 may include a component that permits communication among multiple components of a device 700. Processor 720 may be implemented in hardware, firmware, and/or a combination of hardware and software. Processor 720 may take the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some aspects, processor 720 may include one or more processors capable of being programmed to perform a function. Memory 730 may include a random access memory (RAM), a read only memory (ROM), and/or another type of dynamic or static storage device (e.g., a flash memory, a magnetic memory, and/or an optical memory) that stores information and/or instructions for use by processor 720.

Storage component 740 may store information and/or software related to the operation and use of a device 700. For example, storage component 740 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 750 may include a component that permits a device 700 to receive information, such as via user input (e.g., a touch screen display, a keyboard, a keypad, a mouse, a button, a switch, and/or a microphone). Additionally, or alternatively, input component 750 may include a component for determining location (e.g., a global positioning system (GPS) component) and/or a sensor (e.g., an accelerometer, a gyroscope, an actuator, another type of positional or environmental sensor, and/or the like). Output component 760 may include a component that provides output information from device 700 (via, for example, a display, a speaker, a haptic feedback component, an audio or visual indicator, and/or the like).

Communication interface 770 may include a transceiver-like component (e.g., a transceiver, a separate receiver, a separate transmitter, and/or the like) that enables a device 700 to communicate with other devices, such as via a wired connection, a wireless connection, or a combination of wired and wireless connections. Communication interface 770 may permit device 700 to receive information from another device and/or provide information to another device. For example, communication interface 770 may include an Ethernet interface, an optical interface, a coaxial interface, an infrared interface, a radio frequency (RF) interface, a universal serial bus (USB) interface, a Wi-Fi interface, a cellular network interface, and/or the like.

A device 700 may perform one or more processes described elsewhere herein. A device 700 may perform these processes based on processor 720 executing software instructions stored by a non-transitory computer-readable medium, such as memory 730 and/or storage component 740. As used herein, the term "computer-readable medium" may refer to a non-transitory memory device. A memory device may include memory space within a single physical storage device or memory space spread across multiple physical storage devices.

Software instructions may be read into memory 730 and/or storage component 740 from another computer-readable medium or from another device via communication interface 770. When executed, software instructions stored in memory 730 and/or storage component 740 may cause processor 720 to perform one or more processes described elsewhere herein. Additionally, or alternatively, hardware circuitry may be used in place of or in combination with software instructions to perform one or more processes described elsewhere herein. Thus, implementations described herein are not limited to any specific combination of hardware circuitry and software.

The quantity and arrangement of components shown in FIG. 7 are provided as an example. In practice, a device 700 may include additional components, fewer components, different components, or differently arranged components than those shown in FIG. 7. Additionally, or alternatively, a set of components (e.g., one or more components) of a device 700 may perform one or more functions described as being performed by another set of components of a device 700.

As indicated above, FIG. 7 is provided as an example. Other examples may differ from what is described with regard to FIG. 7.

Persons of ordinary skill in the art will appreciate that the aspects encompassed by the present disclosure are not limited to the particular exemplary aspects described herein. In that regard, although illustrative aspects have been shown and described, a wide range of modification, change, and substitution is contemplated in the foregoing disclosure. It is understood that such variations may be made to the aspects without departing from the scope of the present disclosure. Accordingly, it is appropriate that the appended claims be construed broadly and in a manner consistent with the present disclosure.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" or "device" is intended to be broadly construed as hardware, firmware, or a combination of hardware and software. As used herein, a processor is implemented in hardware, firmware, or a combination of hardware and software.

As used herein, satisfying a threshold may, depending on the context, refer to a value being greater than the threshold, greater than or equal to the threshold, less than the threshold, less than or equal to the threshold, equal to the threshold, or not equal to the threshold, among other examples, or combinations thereof.

It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   determining, by a transmitting device, a current fingerprint associated with a first instance of a source application stored on the transmitting device, the current fingerprint (i) being determined based at least in part on connection information that indicates one or more connection parameters related to an external device communicating with the first instance of the source application and (ii) uniquely identifying the first instance of the source application;
   transmitting, by the transmitting device to a receiving device, verification information including the current fingerprint;
   receiving, by the transmitting device from the receiving device, a determination result determined by the receiving device based at least in part on a comparison of the current fingerprint with a verification fingerprint that uniquely identifies a second instance of the source application stored on another device; and
   selectively transmitting, by the transmitting device, transmission data utilizing the first instance of the source application based at least in part on the determination result.

2. The method of claim 1, wherein the verification information includes a list indicating one or more parameters utilized to determine the current fingerprint.

3. The method of claim 1, wherein selectively transmitting the transmission data includes transmitting the transmission data utilizing the first instance of the source application when the determination result indicates that current fingerprint matches the verification fingerprint.

4. The method of claim 1, wherein selectively transmitting the transmission data includes refraining from transmitting the transmission data utilizing the first instance of the source application when the determination result indicates that current fingerprint fails to match the verification fingerprint.

5. The method of claim 1, wherein determining the current fingerprint includes determining the current fingerprint based at least in part on hashing the connection information.

6. The method of claim 1, further comprising:
   comparing identification information identifying the first instance of the source application with identification information identifying a trusted source application known to be in a state unaffected by malware.

7. The method of claim 1, further comprising:
   storing, in an associated memory, trusted information including an association between a trusted fingerprint and identification information identifying a trusted source application known to be in a state unaffected by malware.

8. A transmitting device, comprising:
   a memory; and
   a processor communicatively coupled with the memory, the memory and the processor being configured to:
   determine a current fingerprint associated with a first instance of a source application stored on the transmitting device, the current fingerprint (i) being determined based at least in part on connection information that indicates one or more connection parameters related to an external device communicating with the first instance of the source application and (ii) uniquely identifying the first instance of the source application;
   transmit, to a receiving device, verification information including the current fingerprint;
   receive, from the receiving device, a determination result determined by the receiving device based at least in part on a comparison of the current fingerprint with a verification fingerprint that uniquely identifies a second instance of the source application stored on another device; and
   selectively transmit transmission data utilizing the first instance of the source application based at least in part on the determination result.

9. The transmitting device of claim 8, wherein the verification information includes a list indicating one or more parameters utilized to determine the current fingerprint.

10. The transmitting device of claim 8, wherein, to selectively transmit the transmission data, the memory and the processor are configured to transmit the transmission data utilizing the first instance of the source application when the determination result indicates that current fingerprint matches the verification fingerprint.

11. The transmitting device of claim 8, wherein, to selectively transmit the transmission data, the memory and the processor are configured to refrain from transmitting the transmission data utilizing the first instance of the source application when the determination result indicates that current fingerprint fails to match the verification fingerprint.

12. The transmitting device of claim 8, wherein, to determine the current fingerprint, the memory and the processor are configured to determine the current fingerprint based at least in part on hashing the connection information.

13. The transmitting device of claim 8, wherein the memory and the processor are configured to compare identification information identifying the first instance of the source application with identification information identifying a trusted source application known to be in a state unaffected by malware.

14. The transmitting device of claim 8, wherein the memory and the processor are configured to store, in an associated memory, trusted information including an association between a trusted fingerprint and identification information identifying a trusted source application known to be in a state unaffected by malware.

15. A non-transitory computer-readable medium configured to store instructions, which when executed by a processor associated with a transmitting device, configure the processor to:
   determine a current fingerprint associated with a first instance of a source application stored on the transmitting device, the current fingerprint (i) being determined based at least in part on connection information that indicates one or more connection parameters related to an external device communicating with the first instance of the source application and (ii) uniquely identifying the first instance of the source application;

transmit, to a receiving device, verification information including the current fingerprint;

receive, to the receiving device, a determination result determined by the receiving device based at least in part on a comparison of the current fingerprint with a verification fingerprint that uniquely identifies a second instance of the source application stored on another device; and selectively transmit transmission data utilizing the first instance of the source application based at least in part on the determination result.

16. The non-transitory computer-readable medium of claim 15, wherein the verification information includes a list indicating one or more parameters utilized to determine the current fingerprint.

17. The non-transitory computer-readable medium of claim 15, wherein, to selectively transmit the transmission data, the processor is configured to transmit the transmission data utilizing the first instance of the source application when the determination result indicates that current fingerprint matches the verification fingerprint.

18. The non-transitory computer-readable medium of claim 15, wherein, to selectively transmit the transmission data, the processor is configured to refrain from transmitting the transmission data utilizing the first instance of the source application when the determination result indicates that current fingerprint fails to match the verification fingerprint.

19. The non-transitory computer-readable medium of claim 15, wherein, to determine the current fingerprint, the processor is configured to determine the current fingerprint based at least in part on hashing the connection information.

20. The non-transitory computer-readable medium of claim 15, wherein the processor is configured to compare identification information identifying the first instance of the source application with identification information identifying a trusted source application known to be in a state unaffected by malware.

* * * * *